(12) United States Patent
Ramaprabhu et al.

(10) Patent No.: US 9,878,913 B2
(45) Date of Patent: Jan. 30, 2018

(54) GRAPHENE FORMATION

(75) Inventors: Sundara Ramaprabhu, Chennai (IN); Adarsh Kaniyoor, Chennai (IN); Tessy Theres Baby, Chennai (IN)

(73) Assignee: Indian Institute of Technology Madras (IN)

( * ) Notice: Subject to any disclaimer, the term of this patent is extended or adjusted under 35 U.S.C. 154(b) by 0 days.

(21) Appl. No.: 13/160,916

(22) Filed: Jun. 15, 2011

(65) Prior Publication Data

US 2012/0321542 A1   Dec. 20, 2012

(51) Int. Cl.
| | |
|---|---|
| *C01B 31/02* | (2006.01) |
| *C01B 31/04* | (2006.01) |
| *B82Y 30/00* | (2011.01) |
| *B82Y 40/00* | (2011.01) |
| *B01J 15/00* | (2006.01) |
| *B01J 19/00* | (2006.01) |
| *B01J 19/18* | (2006.01) |

(52) U.S. Cl.
CPC ............ *C01B 31/043* (2013.01); *B01J 15/00* (2013.01); *B01J 19/0066* (2013.01); *B01J 19/18* (2013.01); *B82Y 30/00* (2013.01); *B82Y 40/00* (2013.01); *C01B 31/0476* (2013.01); *B01J 2219/00006* (2013.01); *B01J 2219/00074* (2013.01)

(58) Field of Classification Search
CPC ................. C01B 31/0438; C01B 32/0438
USPC .............. 423/445 B, DIG. 40, 460; 977/755
See application file for complete search history.

(56) References Cited

U.S. PATENT DOCUMENTS

| | | |
|---|---|---|
| 7,785,492 B1 | 8/2010 | Jang et al. |
| 2005/0156504 A1 | 7/2005 | Takai et al. |
| 2010/0028559 A1 | 2/2010 | Yan et al. |
| | (Continued) | |

FOREIGN PATENT DOCUMENTS

| | | | |
|---|---|---|---|
| CN | 102001642 A | * | 4/2011 |
| CN | 102807209 A | | 5/2012 |
| | (Continued) | | |

OTHER PUBLICATIONS

Novoselov et al. "Electric Field Effect in Atomically Thin Carbon Films"; Science (2004), 36: 666-669.
(Continued)

*Primary Examiner* — Richard M Rump
(74) *Attorney, Agent, or Firm* — Moritt Hock & Hamroff LLP; Steven S. Rubin, Esq.

(57) ABSTRACT

Technologies are generally described for forming graphene and structures including graphene. In an example, a system effective to form graphene may include a chamber adapted to receive graphite oxide. The system may also include a source of an inert gas and a source of hydrogen, which may both be configured in communication with the chamber. A processor may be configured in communication with the chamber, the inert gas source and/or the hydrogen source. The processor may be further configured to control the flow of the inert gas from the first source through the chamber under first sufficient reaction conditions to remove at least some oxygen from the atmosphere of the chamber. The processor may also be configured to control the flow of the hydrogen from the second source to the graphite oxide in the chamber under second sufficient reaction conditions to form graphene from the graphite oxide.

11 Claims, 4 Drawing Sheets

(56) References Cited

U.S. PATENT DOCUMENTS

2010/0028681 A1 2/2010 Dai et al.
2012/0321542 A1 12/2012 Ramaprabhu et al.

FOREIGN PATENT DOCUMENTS

CN 102602924 A 7/2012
CN 102616774 A 8/2012

OTHER PUBLICATIONS

Novoselov et al. "Two-dimensional gas of massless Dirac fermions in graphene"; Nature (2005), 438: 197-200.
Geim et al. "The rise of graphene"; Nature (2007), 6: 183-191.
Hummers et al. "Preparation of Graphitic Oxide"; Am. Chem. Soc. (1958), 80: 1339.
Sun et al. "Nano-Graphene Oxide for Cellular Imaging and Drug Delivery"; Nano Res. (2008), 1(3): 203-212.
Titelman et al. "Characteristics and microstructure of aqueous colloidal dispersions of graphite oxide"; Carbon (2005), 43: 641-649.
Jeong et al. "Unoccupied electronic states in graphite oxides"; Chemical Physics Letters (2008), 460: 499-502.
Wang et al. "Synthesis of enhanced hydrophilic and hydrophobic graphene oxide nanosheets by a solvothermal method"; Carbon (2009), 47: 68-72.
Gao et al. "New Insights into the structure and reduction of graphite oxide"; Nature Chemistry (2009), 1: 1-6.
Gao et al. "New Insights into the structure and reduction of graphite oxide"; Nature Chemistry (2009), Supplementary Information 1-20.
Liu et al. "Reduction of functionalized graphite oxides by trioctylphosphine in non-polar organic solvents"; Carbon (2010), 48: 2282-2289.
Reich et al. "Raman spectroscopy of graphite"; Phil. Trans. R. Soc. Lond. A (2004), 362: 2271-2288.
Tuinstra et al. "Raman Spectrum of Graphite"; J. Chem. Phys. (1970), 53(3): 1126-1130.
Zickler et al. "A reconsideration of the relationship between the crystallite size La of carbons determined by X-Ray diffraction and Raman spectroscopy"; Carbon (2006), 44: 3239-3246.
Wang et al. "Facile Synthesis and Characterization of Graphene Nanosheets"; J. Phys. Chem. (2008),112: 8192-8195.
LV et al. "Low-Temperature Exfoliated Graphenes: Vacuum-Promoted Exfoliation and Electrochemical Energy Storage"; ACS Nano (2009), 3(11): 3730-3736.
Dervishi et al. "Large-Scale graphene production by RF-cCVD method"; Chem. Commun. (2009) 4061-4063.
Dervishi et al. "Large-Scale graphene production by RF-cCVD method"; Chem. Commun. Supplementary Information, (2009) 1-5.
Stoller et al. "Graphene-Based Ultracapacitors"; Nano Lett. (2008) 8(10): 3498-3502.
Chae et al. "A route to high surface area, porosity and inclusion of large molecules in crystals"; Nature (2004) 427: 523-527.
Stankovich et al. "Graphene-based composite materials"; Nature (2006) 442: 282-286.
Schedin et al. "Detection of individual gas molecules adsorbed on graphene"; Nat. Mat. (2007), 6: 652-655.
Yoo et al. "Large Reversible Li Storage of Graphene Nanosheet Families for Use in Rechargeable Lithium Ion Batteries"; Nano Letters (2008), 8(8): 2277-2282.
Chung "Review Graphite"; J. Mater. Sci. (2002), 37: 1-15.
Viculis et al. "Intercalation and exfoliation routes to graphite nanoplatelets"; J. Mater. Chem. (2005), 974-978.
Schniepp et al. "Functionalized Single Graphene Sheets Derived from Splitting Graphine Oxide"; J. Phys. Chem (2006), 110: 8535-8539.
Tung et al. "High-throughput solution processing of large-scale graphene"; Nature Nanotechnology (2009) 4: 25-29.
Meng et al. "Synthesis of Graphene Nanosheets via Thermal Exfoliation of Pretreated Graphite at Low Temperature"; Advanced Materials Research (2010) 123-125: .787.
Wu et al. "Synthesis of high-quality graphene with a pre-determined number of layers"; Carbon (2009) 47: 493-499.
Allen, M.J., et al., "Honeycomb Carbon: A Review of Graphene," Chemical Reviews, vol. 110, Issue 1, pp. 132-145 (2010).
Balandin, A.A., et al., "Superior Thermal Conductivity of Single-Layer Graphene," Nano Letters, vol. 8, No. 3, pp. 902-907 (2008).
Chen, C.S. et al., "Zinc oxide nanoparticle decorated multi-walled carbon nanotubes and their optical properties," Acta Materialia, vol. 54, pp. 5401-5407 (2006).
Cheng, H., et al., "Graphene-Quantum-Dot Assembled Nanotubes: A New Platform for Efficient Raman Enhancement," ACS Nano, vol. 6, No. 3, pp. 2237-2244 (2012).
Cho, S., et al., "Precursor Effects of Citric Acid and Citrates on ZnO Crystal Formation," Langmuir, vol. 25, pp. 3825-3831 (2009).
Eswaraiah, V., et al., "Top down method for synthesis of highly conducting graphene by exfoliation of graphite oxide using focused solar radiation," Journal of Material Chemistry, vol. 21, pp. 6800-6803 (2011).
Forsman, W.C., et al., "Chemistry of graphite intercalation by nitric acid," Carbon, vol. 16, Issue 4, pp. 269-271 (1978).
Huang, W., et al., "Solubilization of Single-Walled Carbon Nanotubes with Diamine-Terminated Oligomeric Poly (ethylene Glycol) in Different Functionalization Reactions," Nano Letters, vol. 3, Issue 4, pp. 565-568 (2003).
International Search Report and Written Opinion for International Application No. PCT/IB2014/063909 dated Apr. 14, 2015, pp. 9.
Jeong, S-H., et al., "Template-based carbon nanotubes and their application to a field emitter," Applied Physics Letter, vol. 78, Issue 14, pp. 2052-2054 (Apr. 2001).
Kaniyankandy, S., et al., "Ultrafast Charge Transfer Dynamics in Photoexcited CdTe Quantum Dot Decorated on Graphene," Journal of Physical Chemistry C, vol. 116, No. 30, pp. 16271-16275 (2012).
Kong, B-S., et al., "Electrical Conductivity of Graphene Films with a Poly(allylamine hydrochloride) Supporting Layer," Langmuir, vol. 25, No. 18, pp. 11008-11013 (Aug. 6, 2009).
Li, X., et al., "Chemically derived, ultrasmooth graphene nanoribbon semiconductors," Science, vol. 319, Issue 5867, pp. 1229-1232 (Feb. 29, 2008).
Li, Y., et al., "Nitrogen-Doped Graphene Quantum Dots with Oxygen-Rich Functional Groups," Journal of the American Chemical Society, vol. 134, No. 1, pp. 15-18 (2012).
Lin, Y-H., et al., "Atomic Layer Deposition of Zinc Oxide on Multiwalled Carbon Nanotubes for UV Photodetector Applications," Journal of the Electrochemical Society, vol. 158, Issue 2, pp. K24-K27 (2011).
Ma, W-L., and Li, S-S., "Electrically controllable energy gaps in graphene quantum dots," Applied Physics Letters, vol. 100, Issue 16, pp. 163109-1-163109-4 (Apr. 2012).
Pan, D., et al., "Hydrothermal Route for Cutting Graphene Sheets into Blue-Luminescent Graphene Quantum Dots," Advanced Materials, vol. 22, Issue 6, pp. 734-738 (Feb. 9, 2010).
Peng, J., et al., "Graphene Quantum Dots Derived from Carbon Fibers," Nano Letters, vol. 12, Issue 2, pp. 844-849 (2012).
Qian, L., et al., "Electroluminescence from light-emitting polymer/ZnO nanoparticle heterojunctions at sub-bandgap voltages," Nano Today, vol. 5, Issue 5, pp. 384-389 (Jan. 2010).
Shen, J., et al., "Facile preparation and upconversion luminescence of graphene quantum dots," Chemical Communications, vol. 47, Issue 9, pp. 2580-2582 (2011).
Shen, J., et al., "Graphene quantum dots: emergent nanolights for bioimaging, sensors, catalysis and photovoltaic devices," Chemical Communications, vol. 48, Issue 31, pp. 3686-3699 (2012).
Shen, J., et al., "One-pot hydrothermal synthesis of graphene quantum dots surface-passivated by polyethylene glycol and their photoelectric conversion under near-infrared light," New Journal of Chemistry, vol. 36, Issue 1, pp. 97-101 (2012).
Singh TH.J. and Bhatt S.V., "Morphology and conductivity studies of a new solid polymer electrolyte: (PEG) xLiClO4," Bulletin of Materials Science, vol. 26, Issue 7, pp. 707-714 (Dec. 2003).

(56) References Cited

OTHER PUBLICATIONS

Sun Y-P., et al., "Quantum-Sized Carbon Dots for Bright and Colorful Photoluminescence," Journal of the American Chemical Society, vol. 128, Issue 24, pp. 7756-7757 (Jun. 21, 2006).
Wang, J., et al., "Cu2ZnSnS4 nanocrystals and graphene quantum dots for photovoltaics," Nanoscale, vol. 3, Issue 8, pp. 3040-3048 (2011).
Wang, X., et al., "Room-temperature all-semiconducting sub-10-nm graphene nanoribbon field-effect transistors," Physical Review Letters, vol. 100, Issue 20, pp. 206803-1-206803-4 (May 23, 2008).
Williams, G. and Kamat, V.P., "Graphene-Semiconductor Nanocomposites: Excited-State Interactions between ZnO Nanoparticles and Graphene Oxide," Langmuir, vol. 25, Issue 24, pp. 13869-13873 (2009).
Yu, K., et al., "Significant improvement of field emission by depositing zinc oxide nanostructures on screen-printed carbon nanotube films," Applied Physics Letter, vol. 88, Issue 15, pp. 153123-1-153123-3 (2006).
Zhu, S., et al., "Strongly green-photoluminescent graphene quantum dots for bioimaging applications," Chemical Communications, vol. 47, Issue 24, pp. 6858-6860 (2011).
Kaniyoor, A., et al., "Graphene synthesis via hydrogen induced low temperature exfoliation of graphitic oxide," Journal of Materials Chemistry, Sep. 7, 2010, pp. 8467-8469, vol. 20.
Kaniyoor, A., et al., "Graphene synthesis via hydrogen induced low temperature exfoliation of graphitic oxide," Supplementary Material (ESI) for Journal of Materials Chemistry, Supplementary Information, 2010, pp. 1-9.
Mei, X. and Ouyang, J., "Ultrasonication-assisted ultrafast reduction of graphene oxide by zinc powder at room temperature," Carbon, vol. 49, Issue 15, pp. 5389-5397 (2011).
Baby, T. T., et al., "Cold field emission from hydrogen exfoliated graphene composites," Applied Physics Letters, vol. 98, Issue 18, pp. 183111-1-183111-3 (May 2011).
Baby, T. T., and Ramaprabhu, S., "Effect of metal nanoparticles decoration on electron field emission property of graphene sheets," Nanoscale, vol. 3, Issue 10, pp. 4170-4173 (Aug. 25, 2011).
Baby, T.T., "Carbon Nanocomposites: Synthesis and Applications in Electron Field Emission, Nanofluid and Biosensor," Thesis, Award of the degree of Doctor of philosophy, Indian Institute of technology, Madras, Department of Physics, pp. 17, (Mar. 2011).
Chen, G. et al., "Atomic decoration for improving the efficiency of field electron emission of carbon nanotubes," Journal of Physical Chemistry C, pp. vol. 111, No. 3, pp. 4939-4945 (Mar. 9, 2007).
Gomez-Navarro, C., et al., "Electronic Transport Properties of Individual Chemically Reduced Graphene Oxide Sheets," Nano letter, vol. 7, No. 11, pp. 3499-3503 (Nov. 2007).
Gokus, T., et al., "Making Graphene Luminescent by Oxygen Plasma Treatment," ACS Nano, vol. 3, No. 12, pp. 3963-3968 (Nov. 19, 2009).
Goswami, S., et al., "Preparation of graphene-polyaniline composites by simple chemical procedure and its improved field emission properties," Carbon, vol. 49, Issue 7, pp. 2245-2252, (Jun. 2011).
Green, A. A., Hersam, M.C., "Solution Phase Production of Graphene with Controlled Thickness via Density Differentiation," Nano letters, vol. 9, No. 12, pp. 4031-4036 (2009).
Hwang, J. K., et al., "Vertical ZnO nanowires/graphene hybrids for transparent and flexible field emission," Journal of Materials Chemistry, vol. 21, No. 10, pp. 3432-3437 (2011).
Hwang, J. O., et al., "Work Function-Tunable, N-Doped Reduced Graphene Transparent Electrodes for High-Performance Polymer Light-Emitting Diodes," ACS Nano, vol. 6, No. 1, pp. 159-167 (Aug. 18, 2011).
Jang, H.-S., et al., "Enhancement of field emission of SnO2 nanowires film by exposure of hydrogen gas," Solid state communications, vol. 140, Issue 11-12, pp. 495-499 (2006).
Knibbe, R., et al., "Ultrahigh Electron Emissive Carbon Nanotubes With Nano-Sized Ruo2 Particles Deposition," Journal of nanoparticle research, vol. 9, Issue 6, pp. 1201-1204 (Dec. 2007).
Kudin, K. N., et al., "Raman Spectra of Graphite Oxide and Functionalized Graphene Sheets," Nano letters, vol. 8, Issue 1, pp. 36-41 (2008).
Lee, S.W., et al., "A Study on Field Emission Characteristics of Planar Graphene Layers Obtained From a Highly Oriented Pyrolyzed Graphite Block," Nanoscale research Letters, vol. 4, Issue 10, pp. 1218-1221 (2009).
Liu, J., et al., "Ultrathin seed-layer for tuning density of ZnO nanowire arrays and their field emission characteristics,"American chemical society, Journal of physical chemistry C, vol. 112, No. 31, pp. 11685-11690 (2008).
Liu, J., et al., "Improved field emission property of graphene paper by plasma treatment," Applied Physics letters, vol. 97, Issue 3, pp. 033109-1-033109-3 (2010).
Lu, Z., et al., "The Field Emission Properties of Graphene Aggregates Films Deposited on Fe—Cr—Ni Alloy Substrates," Journal of nanomaterials, vol. 2010, pp. 4 (2010).
Maiti, A., et al., "Effect of Adsorbates on field emission from carbon nanotubes," Physical review letters, vol. 87, Issue 15, pp. 1-4 (Sep. 24, 2001).
Murakami, H., et al., "Field emission from well-aligned, patterned, carbon nanotube emitters," Applied Physics letter, vol. 76, Issue 13, pp. 1776-1778 (2000).
"Composition of Platinum," National Institute for standards and technology, http://physics.nist.gov/cgi-bin/Star/compos.pl?matno=078, accessed on Jul. 1, 2015, p. 1.
Parambhath, V. B., et al., "Investigation of Spillover Mechanism in Palladium Decorated Hydrogen Exfoliated Functionalized Graphene," Journal of physical chemistry C, vol. 115, Issue 31, pp. 15679-15685 (2011).
Rakhi, R.B., et al., "Electron field emitters based on multiwalled carbon nanotubes decorated with nanoscale metal clusters," Journal of Nanoparticle Research, vol. 10, Issue 1, pp. 179-189 (May 15, 2007).
Shang, D., et al., "Magnetic and field emission properties of straw-like CuO nanostructures," Applied Surface science, vol. 255, Issue 7, pp. 4093-4096 (Jan. 15, 2009).
Si, Y., and Samulski, E. T., "Exfoliated Graphene Separated by Platinum Nanoparticles," Chemistry of Material, vol. 20, Issue 21, pp. 6792-6797, American Chemical Society (2008).
Soin, N., et al., "Enhanced and Stable Field Emission From In Situ Nitrogen-Doped Few Layered Graphene Nanoflakes," Journal of Physical Chemistry, vol. 115, Issue 13, pp. 5366-5372 (2011).
Wang, J. J., et al., "Free-standing subnanometer graphite sheets," Applied Physics Letters, vol. 85, pp. 1265-1267 (2004).
Yamaguchi, H., et al., "Field Emission From Atomically Thin Edges of Reduced Graphene Oxide," ACS Nano, vol. 5, Issue 6, pp. 4945-4952 (2011).
Yoo, E., et al., "Enhanced Electrocatalytic Activity of Pt Subnanoclusters on Graphene Nanosheet Surface," Nano letters, vol. 9, No. 6, pp. 2255-2259, American chemical society (2009).
Y.-J., et al., "Tuning the Graphene Work Function by Electric Field Effect," Nano letters, vol. 9, No. 10, pp. 3430-3434 American chemical society (2009).
Zhang, S., et al., "Field-emission mechanism of island-shaped graphene-BN Nanocomposite," Journal of Physical Chemistry C, vol. 115, Issue 19, pp. 9471-9476 (2011).
Zhang, S., et al., "First-principles study of field emission properties of graphene-ZnO Nanocomposite," Journal of Physical Chemistry C, vol. 114, No. 45, pp. 19284-19288 (2010).
Zheng, W. T., et al., "Field Emission From a Composite of Graphene Sheets and ZnO Nanowires," Journal of Physical Chemistry C, vol. 113, No. 21, pp. 9164-9168 (2009).
Zhu, Y.W., et al., "Large-scale synthesis and field emission properties of vertically oriented CuO nanowire films," Nanotechnology, vol. 16, Issue 1, pp. 88-92 (2005).

* cited by examiner

200

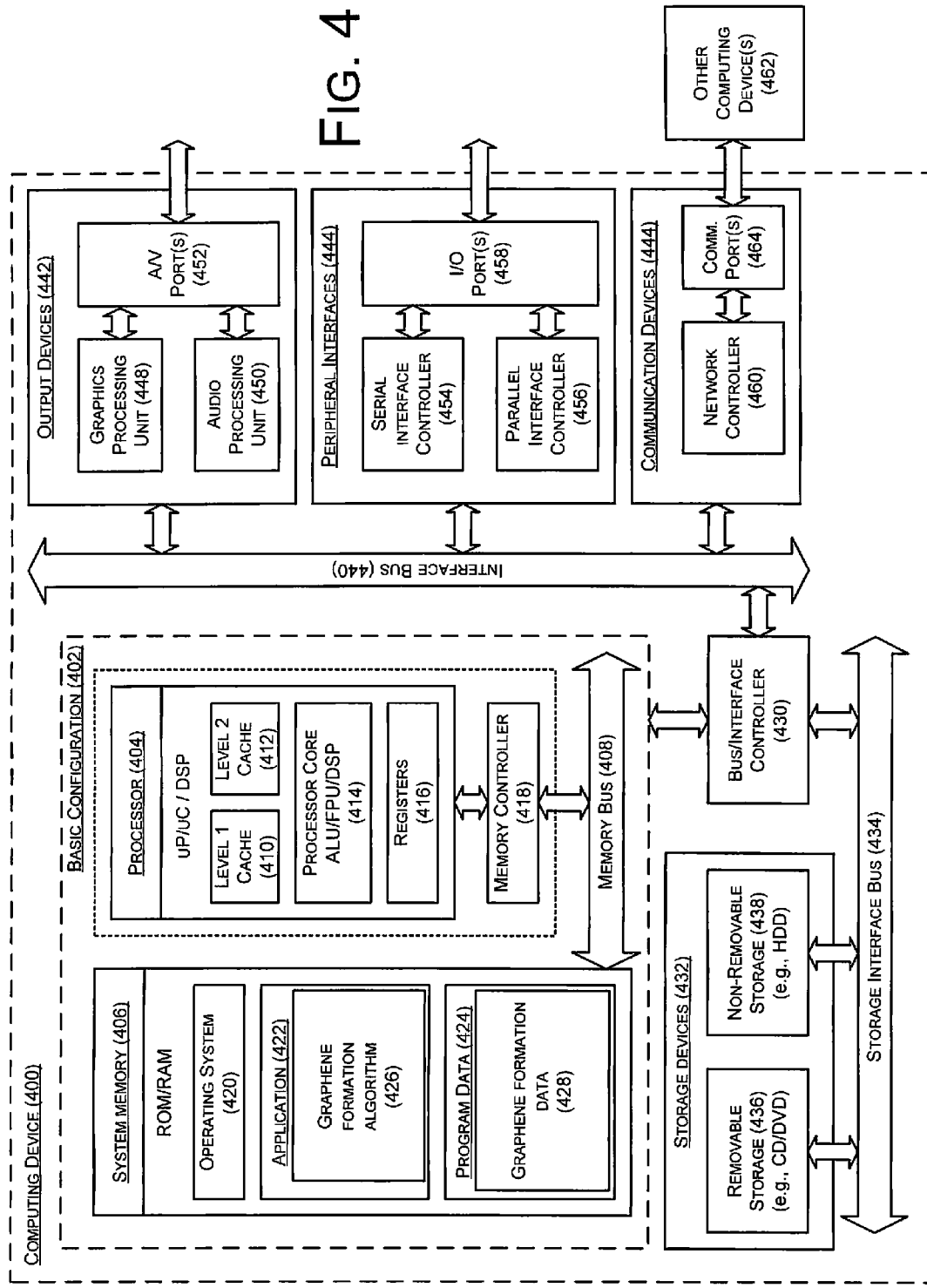

GRAPHENE FORMATION

BACKGROUND

Unless otherwise indicated herein, the materials described in this section are not prior art to the claims in this application and are not admitted to be prior art by inclusion in this section.

Graphene is a material that generally may include a one atom thick layer of bonded carbon atoms. Graphene may be formed by growing carbon atoms on top of another material such as copper. The copper may be inserted into a quartz tube, heated, and annealed. A gas mixture of $CH_4$ and $H_2$ may then be flowed into the tube and the copper may then be cooled with flowing $H_2$ to form graphene.

SUMMARY

In some examples, a method of forming graphene is generally described. The method may include flowing an inert gas through a chamber including graphite oxide disposed therein under first sufficient reaction conditions to remove at least some oxygen from an atmosphere in the chamber. The method may further include exposing the graphite oxide in the chamber to hydrogen under second sufficient reaction conditions to form graphene.

In some examples, a system effective to form graphene is generally described. In some examples, the system may include a chamber, a first source of an inert gas, a second source of hydrogen, and a processor. The chamber may be adapted to receive graphite oxide, and the chamber may define an atmosphere. The first source of an inert gas may be configured to be in communication with the chamber. The second source of hydrogen may be configured to be in communication with the chamber. The processor may be configured to be in communication with the chamber, the first source and the second source. The processor may be configured effective to control the flow of the inert gas from the first source through the chamber under first sufficient reaction conditions to remove at least some oxygen from the atmosphere. The processor may further be configured effective to control the flow of the hydrogen from the second source to the graphite oxide in the chamber under second sufficient reaction conditions to form graphene from the graphite oxide.

In some examples, a computer storage medium having computer-executable instructions stored thereon which, when executed by a computer, adapt the computer to perform a method of forming graphene is generally described. In some examples, the method include flowing an inert gas through a chamber including graphite oxide disposed therein under first sufficient reaction conditions to remove at least some oxygen from an atmosphere in the chamber. The method may further include exposing the graphite oxide in the chamber to hydrogen under second sufficient reaction conditions to form graphene.

In some examples, a method for forming graphite oxide is generally described. In some examples, the method may include combining graphite, sodium nitrate and potassium permanganate in sulfuric acid to produce a first combination. The method may include placing the first combination in a first container. The method may include placing the first container in a second container, the second container including ice water. The method may include stirring the first combination to produce a second combination. The method may include removing the first container from the second container. The method may include raising the temperature of the first container to a temperature in a range of about 25 degrees Celsius to about 30 degrees Celsius. The method may include adding distilled water to the second combination. The method may include stirring the distilled water and the second combination. The method may include adding water with a temperature in a range of about 60 degrees Celsius to about 70 degrees Celsius to the distilled water and the second combination to produce a third combination. The method may include stirring the third combination. The method may include adding $H_2O_2$ to the third combination to produce a fourth combination. The method may include filtering the fourth combination to produce a filter cake. The method may include adding water to the filter cake to produce a fifth combination. The method may include spinning the fifth combination to produce a product. The method may include drying the product to produce the graphite oxide.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 is a block diagram illustrating an example computing device that is arranged to implement graphene formation; all arranged according to at least some embodiments described herein.

DETAILED DESCRIPTION

Figure 1:
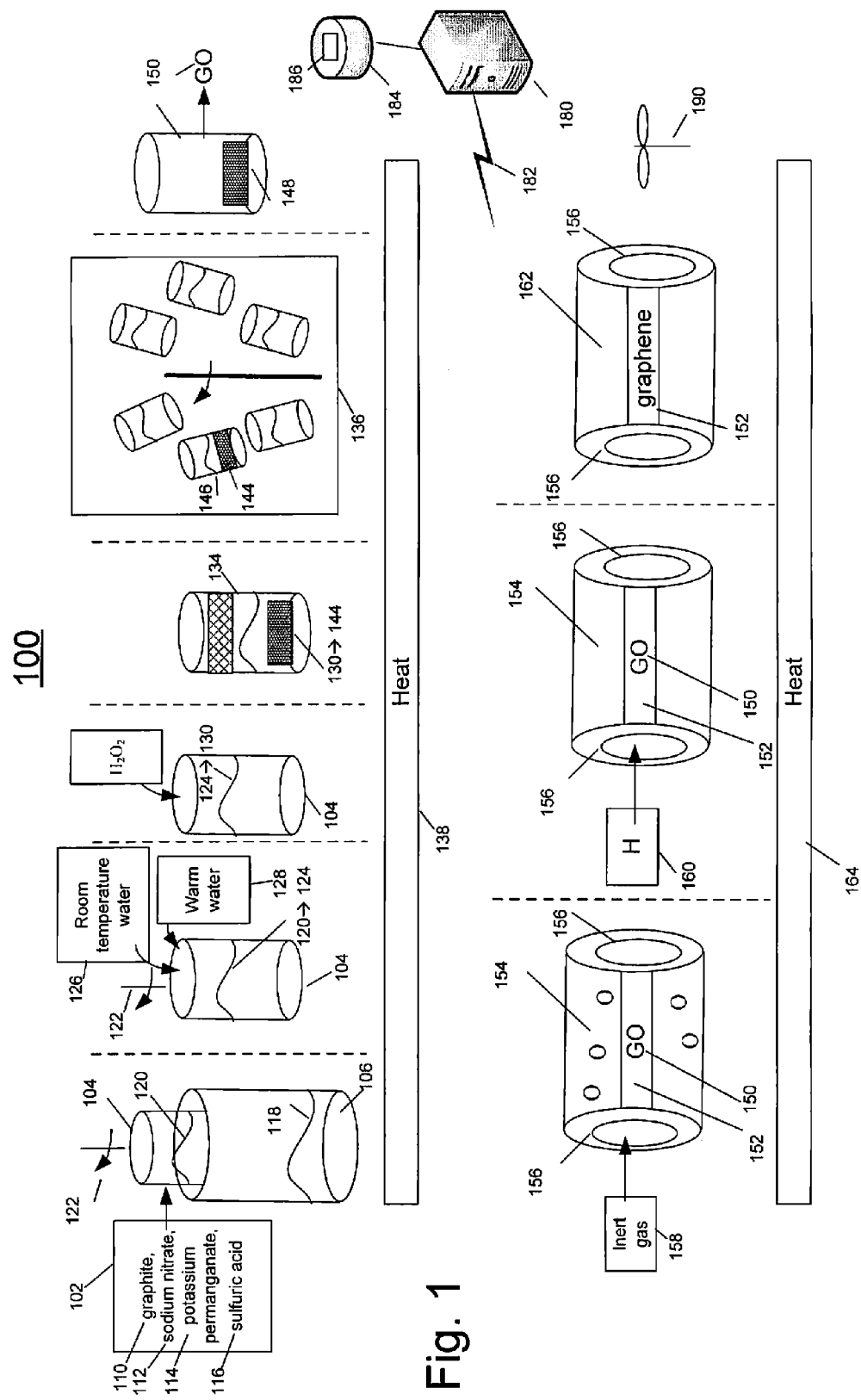
FIG. 1 illustrates an example system that can be utilized to implement graphene formation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to systems, methods, materials and apparatus related to graphene and the formation of graphene.

Briefly stated, technologies are generally described for forming graphene and structures including graphene. In an example, a system effective to form graphene may include a chamber adapted to receive graphite oxide. The system may also include a source of an inert gas and a source of hydrogen, which may both be configured in communication with the chamber. A processor may be configured in communication with the chamber, the inert gas source and/or the hydrogen source. The processor may be further configured to control the flow of the inert gas from the first source through the chamber under first sufficient reaction conditions to remove at least some oxygen from the atmosphere of the chamber. The processor may also be configured to control the flow of the hydrogen from the second source to the graphite oxide in the chamber under second sufficient reaction conditions to form graphene from the graphite oxide.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

FIG. 1 illustrates an example system that can be utilized to implement graphene formation in accordance with at least some embodiments described herein. An example graphene formation system 100 may include a source of materials 102, a container 104, a container 106, a stirring device 122, a filter 134, a centrifuge 136, a heating device 138, a source of an inert gas 158, a source of hydrogen 160, a chamber 154, a heating device 164, and/or a fan 190. At least some of these elements may be arranged in communication with a processor 180 through a communication link 182. In some examples, processor 180 may be adapted in communication with a memory 184 that may include instructions 186 stored therein. Processor 180 may be configured, such as by instructions 186, to control at least some of the operations/actions/functions described below.

Source of materials 102 may include graphite 110, sodium nitrate 112, potassium permanganate 114, and/or sulfuric cid 116. In an example, graphite 110 may be combined with sulfuric acid 116, such as by hand or machine, and the combination of graphite 110 and sulfuric acid 116 may be placed in container 104 over a time interval in a range from about 1 minute to about 2 minutes. Container 104 may be placed in container 106. Container 106 may include ice water 118 at about 0 degrees Celsius. Sodium nitrate 112 may be added to the combination of graphite 110 and sulfuric acid 116, such as by hand or machine, over a period of about 1 minute to about 2 minutes. The combination of graphite 110, sulfuric acid 116 and sodium nitrate 112 may be left to dissolve over a time interval of about 5 minutes to about 10 minutes. Potassium permanganate 114 may be added, such as by hand or machine, to the combination of graphite 110, sulfuric acid 116, and sodium nitrate 112 over a time interval in a range from about 5 minutes to about 6 minutes to produce a combination 120. In an example, a ratio of graphite to sodium nitrate to potassium permanganate may be 2:1:6. In an example, a ratio of 2 grams of graphite to 47 ml of sulfuric acid, or a 1:23 ratio, may be used.

Combination 120 may be stirred using a stirring device 122 for about 30 minutes. Container 104 may then be removed from container 106 and left in a room with a temperature of about 20 degrees Celsius to about 30 degrees Celsius for a time interval in a range from about 20 minutes to about 30 minutes. A temperature of container 104 may thus be allowed to rise to a range from about 20 degrees Celsius to about 30 degrees Celsius.

Distilled or de-ionized or doubly distilled water 126 may be added, such as by hand or machine, to combination 120 over a time interval of about 5 minutes. In an example, about 92 ml of distilled water may be added resulting in a ratio of distilled water 126 to sulfuric acid 116 of about 2:1. Combination 120, with water 126 may be stirred by stirring device 122 for about 15 minutes. Warm water 128 may be added, such as by hand or machine, to combination 120 with water 126. Warm water 128 may have a temperature, for example, in a range from about 60 degrees Celsius to about 70 degrees Celsius. In an example, about 280 ml of warm water may be added resulting in a ratio of warm water 128 to sulfuric acid 116 of about 6:1. Stirring device 122 may be configured to stir combination 120, water 126 and water 128 for a time interval of about 5 minutes to produce a combination 124.

About 2 ml to about 20 ml of about 3% to about 30% by weight $H_2O_2$ may be added, such as by hand or machine, to combination 124 over a time interval from about 5 minutes to about 10 minutes to produce combination 130. Combination 130 may be yellow in color. Combination 130 may be filtered with a filter 134 to produce a filter cake 144. In some examples, filter 134 may include a nitro cellulose membrane filter or a TEFLON filter with a pore size of about equal to or less than 0.22 micrometers. Filter cake 144 may be repeatedly filtered through nitro cellulose membrane filter 134 and washed with water in a range of temperatures from about 60 degrees Celsius to about 70 degrees Celsius. In an example, the process of filtering through filter 134 and then washing with warm water may be repeated four times.

Filter cake 144 may be diluted using, for example about 600 ml, de-ionized water 146 and placed in centrifuge 136. The combination of filter cake 144 and de-ionized water 146 may be centrifuged at a rate of about 10,000 rpm for about 30 minutes to produce a product 148. Product 148 may be dried in a vacuum in a temperature in a range from about 50 degrees Celsius to about 60 degrees Celsius to produce graphite oxide 150.

Graphite oxide 150 may be placed, such as by hand or machine, in a quartz boat 152. Chamber 154 may be adapted to receive graphite oxide 150 and/or quartz boat 152 including graphite oxide 150. Chamber 154 may include couplings 156 effective to selectively allow gas to enter into and/or leave chamber 154. Processor 180 may be configured to control a flow of inert gas 158, such as Argon, Nitrogen, Helium, etc., through chamber 154 for a time interval in a range from about 5 minutes to about 10 minutes. Processor 180 may be configured to control heat device 164 such that a temperature of chamber 154 may be in a range from about 25 degrees Celsius to about 30 degrees Celsius. In some examples, a flowing of inert gas 158 may be effective to remove at least some oxygen from an atmosphere inside chamber 154. In examples where chamber 154 is a quartz tube with a 25 mm diameter, the inert gas 158 may be Argon and may be flowed at about 40 standard cubic centimeters per minute (SCCM).

In an example, a flow of inert gas 158 may continue while processor 180 is configured to control heat device 164 effective to heat chamber 154 to a temperature of about 200 degrees Celsius at a rate of about 20 degrees per minute. About the time when chamber 154 is at about 200 degrees Celsius, processor 180 may be configured to stop a flow of inert gas 158. Processor 180 may be configured to control a flow of hydrogen from hydrogen source 160 effective to expose graphite oxide 150 in chamber 154 to produce graphene 162. In an example, processor 180 may be configured to flow hydrogen at a rate of about 20 SCCM. In an example, hydrogen may be flowed over a time interval of about 15 minutes. Chamber 154 may then be cooled, such as by processor 180 controlling fan 190, to a temperature in a range from about 25 degrees Celsius to about 30 degrees Celsius.

In an example, a flow of inert gas 158 may be continued for a time interval of about 15 minutes to about 30 minutes while chamber 154 is at a temperature in a range of about 25 degrees Celsius to about 30 degrees Celsius. Processor 180 may be configured to then stop the flow of inert gas 158. Processor 180 may be configured to control a flow of hydrogen from hydrogen source 160 effective to expose graphite oxide 150 in chamber 154 to produce graphene 162. During this time, processor 180 may be configured to control heat device 164 effective to heat chamber 154 to a temperature of about 200 degrees Celsius at a rate of about 20 degrees per minute. At about 200 degrees Celsius, graphite oxide present in chamber 154 may be converted to graphene within about 1 minute. The flow of hydrogen may be continued for over a time interval of about another 15 minutes. The flow of hydrogen may then be stopped and the chamber may be cooled, such as by processor 180 controlling fan 190, to a temperature in a range from about 25 degrees Celsius to about 30 degrees Celsius.

In an example, graphite oxide 150 may include basal planes occupied by —OH groups. These —OH groups may be at least partially removed through the exposure of hydrogen and the application of heat in an exothermic reaction. The exothermic reaction may supply sufficient energy to disrupt the basal planes of graphite oxide 150 resulting in exfoliation and/or reduction of graphite oxide 150 into graphene 152.

Among other benefits, a system arranged in accordance with the present disclosure may be used to form one or more graphene layers which could be useful in large scale production. A very high exfoliation temperature, such as over 1000 degrees Celsius, or a long exfoliation period, such as over a period of about 5 hours, are not needed. Environmentally hazardous solvents such as hydrazine need not be used.

Figure 2:
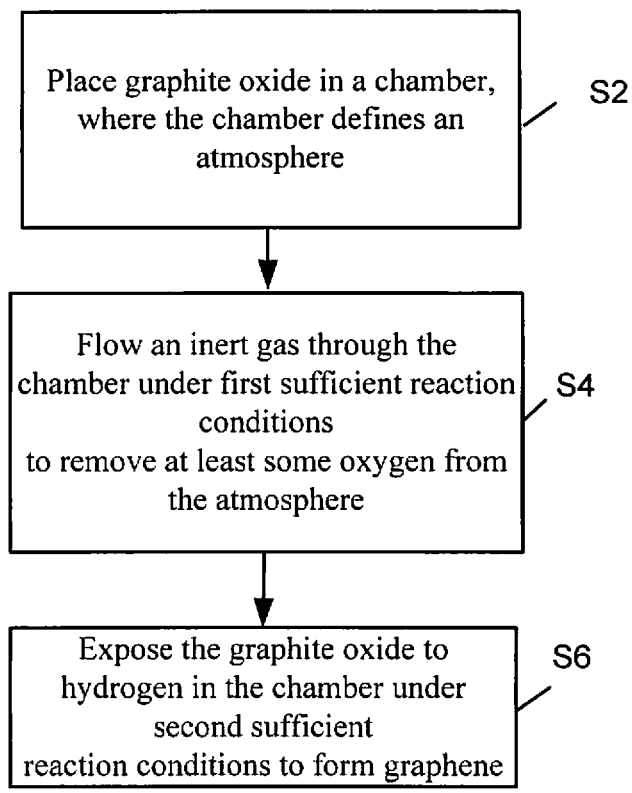
FIG. 2 depicts a flow diagram for an example process for forming graphene.

FIG. 2 depicts a flow diagram for an example process 200 for forming graphene in accordance with at least some embodiments described herein. The process in FIG. 2 could be implemented using, for example, system 100 discussed above. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation.

Process 200 may begin at block S2, "Place graphite oxide in a chamber, where the chamber defines an atmosphere." At block S2, graphite oxide may be placed in a chamber such as by hand or through a machine. In some examples, the graphite oxide may be placed in a quartz boat inside the chamber.

Processing may continue from block S2 to block S4, "Flow an inert gas through the chamber under first sufficient reaction conditions to remove at least some oxygen from the atmosphere." At block S4, a processor may be configured to control a flow of an inert gas, such as Argon, from a source through the chamber. First sufficient reaction conditions may include flowing Argon through the chamber over a time interval in a range from about 5 minutes to about 10 minutes, where the temperature of the chamber is in a range of about 25 degrees Celsius to about 30 degrees Celsius. The first sufficient reaction conditions may further include flowing the Argon through the chamber for about 10 minutes while increasing the temperature of the chamber to a range of about 200 degrees Celsius to about 300 degrees Celsius.

Processing may continue from block S4 to block S6, "Expose the graphite oxide to hydrogen in the chamber under second sufficient reaction conditions to form graphene." At block S6, the processor may be configured to control a flow of hydrogen from a source to the graphite oxide. In some examples, the second sufficient reaction conditions may include exposing the graphite oxide to hydrogen at a rate of about 20 standard cubic centimeters per minute where a temperature of the chamber is in a range of about 200 degrees Celsius to about 300 degrees Celsius.

Figure 3:
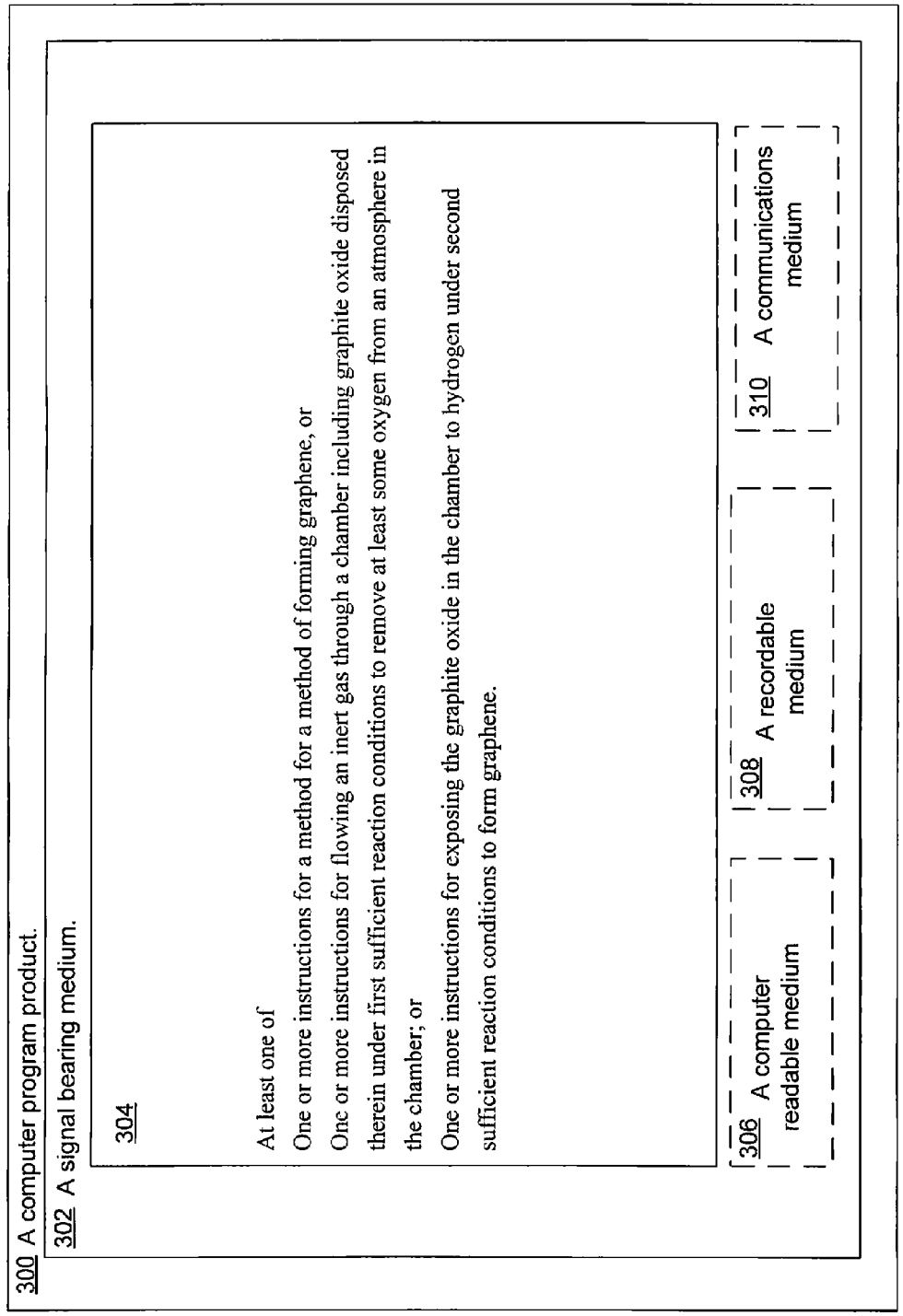
FIG. 3 illustrates a computer program product that can be utilized to implement graphene formation.

FIG. 3 illustrates a computer program product that can be utilized to implement graphene formation in accordance with at least some embodiments described herein. Program product 300 may include a signal bearing medium 302. Signal bearing medium 302 may include one or more instructions 304 that, when executed by, for example, a processor, may provide the functionality described above with respect to FIGS. 1-2. Thus, for example, referring to system 100, processor 154 may undertake one or more of the blocks shown in FIG. 3 in response to instructions 304 conveyed to the system 100 by medium 302.

In some implementations, signal bearing medium 302 may encompass a computer-readable medium 306; such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 4 is a block diagram illustrating an example computing device that is arranged to implement graphene formation according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a graphene formation algorithm 426 that is arranged to perform the various functions/actions/operations as described herein including at least those described with respect to system 100 of FIGS. 1-3. Program data 424 may include graphene formation data 428 that may be useful for implementing graphene formation as is described herein. In some embodiments, application 422 may be arranged to operate with program data 424 on operating system 420 such that graphene formation may be provided. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of forming graphene, the method comprising:
    flowing an inert gas through an atmosphere in a chamber, wherein the chamber includes graphite oxide placed therein, wherein the inert gas is flowed through the chamber under first sufficient reaction conditions to remove at least some oxygen from the atmosphere in the chamber; and
    after flowing the inert gas, exposing the graphite oxide in the chamber to hydrogen at a rate of 20 standard cubic centimeters per minute and under second sufficient reaction conditions to form graphene.

2. The method as recited in claim 1, further comprising:
    placing the graphite oxide in a quartz boat; and
    placing the quartz boat inside the chamber.

3. The method as recited in claim 1, further comprising:
    placing the graphite oxide in a quartz boat with a diameter of about 25 mm; and
    placing the quartz boat inside the chamber.

4. The method as recited in claim 1, wherein the first reaction conditions include flowing argon through the chamber.

5. The method as recited in claim 1, wherein the first reaction conditions include flowing argon through the chamber over a time interval in a range from 5 minutes to 10 minutes, where the chamber is at a temperature in a range of 25 degrees Celsius to 30 degrees Celsius.

6. The method as recited in claim 1, wherein the first reaction conditions include:
    flowing the inert gas through the chamber over a time interval in a range from 5 minutes to 10 minutes, where the temperature of the chamber is 25 degrees Celsius to 30 degrees Celsius; and
    flowing the inert gas through the chamber for 10 minutes while increasing the temperature of the chamber to a range of 200 degrees Celsius to 300 degrees Celsius.

7. The method as recited in claim 1, wherein the first reaction conditions include:
    flowing argon through the chamber over a time interval in a range from 5 minutes to 10 minutes, where the temperature of the chamber is in a range of 25 degrees Celsius to 30 degrees Celsius; and
    flowing the argon through the chamber for 10 minutes while increasing the temperature of the chamber to a range of 200 degrees Celsius to 300 degrees Celsius.

8. The method as recited in claim 1, further comprising stopping flowing the inert gas prior to exposing the graphite oxide to the hydrogen.

9. The method as recited in claim 1, further comprising combining graphite, sodium nitrate and potassium permanganate in sulfuric acid under sufficient reaction conditions to produce the graphite oxide.

10. The method as recited in claim 1, wherein the graphite oxide is produced by:
    combining graphite, sodium nitrate and potassium permanganate in sulfuric acid to produce a first combination;
    placing the first combination in a first container;
    placing the first container in a second container, the second container including ice water;
    stirring the first combination to produce a second combination;
    removing the first container from the second container;
    raising the temperature of the first container to a temperature in a range of 25 degrees Celsius to 30 degrees Celsius;
    adding distilled water to the second combination;
    stirring the distilled water and the second combination;
    adding water with a temperature in a range of 60 degrees Celsius to 70 degrees Celsius to the distilled water and the second combination to produce a third combination;
    stirring the third combination;
    adding $H_2O_2$ to the third combination to produce a fourth combination;
    filtering the fourth combination to produce a filter cake;
    adding water to the filter cake to produce a fifth combination;

spinning the fifth combination to produce a product; and
drying the product to produce the graphite oxide.

11. A method of forming graphene, the method comprising:
flowing an inert gas through an atmosphere in a chamber, wherein the chamber includes graphite oxide placed therein, wherein the inert gas is flowed through the chamber under first sufficient reaction conditions to remove at least some oxygen from the atmosphere in the chamber; and
after flowing the inert gas, exposing the graphite oxide in the chamber to hydrogen at a rate of 20 standard cubic centimeters per minute, a temperature in a range of 200 degrees Celsius to 300 degrees Celsius, and under second sufficient reaction conditions to form graphene.

* * * * *

UNITED STATES PATENT AND TRADEMARK OFFICE
CERTIFICATE OF CORRECTION

PATENT NO. : 9,878,913 B2
APPLICATION NO. : 13/160916
DATED : January 30, 2018
INVENTOR(S) : Sundara et al.

It is certified that error appears in the above-identified patent and that said Letters Patent is hereby corrected as shown below:

On the Title Page

In Item (12), under "United States Patent", in Column 1, Line 1, delete "Ramaprabhu et al." and insert -- Sundara et al. --, therefor.

In Item (75), under "Inventors", in Column 1, Line 1, delete "Sundara Ramaprabhu," and insert -- Ramaprabhu Sundara, --, therefor.

In Item (73), under "Assignee", in Column 1, Lines 1-2, delete "Indian Institute of Technology Madras (IN)" and insert -- Indian Institute of Technology Madras, Tamil Nadu (IN)" --, therefor.

In the Drawings

In Fig. 3, Sheet 3 of 4, for Tag "304", Line 2, delete "instructions for a method for a method of" and insert -- instructions for a method of --, therefor.

In Fig. 4, Sheet 4 of 4, for Tag "(444)", Line 1, delete "COMMUNICATION DEVICES (444)" and insert -- COMMUNICATION DEVICES (446)" --, therefor.

In Fig. 4, Sheet 4 of 4, delete "UP/UC/ DSP" and insert -- $\mu P/\mu C/$ DSP --, therefor.

In the Specification

In Column 2, Lines 43-44, delete "formation;" and insert -- formation, --, therefor.

In Column 2, Lines 44-45, delete "all arranged…herein." and insert the same at Line 45, as a continuation sub-point, therefor.

In Column 3, Line 40, delete "sulfuric cid" and insert -- sulfuric acid --, therefor.

Signed and Sealed this
Twenty-seventh Day of November, 2018

Andrei Iancu
*Director of the United States Patent and Trademark Office*

CERTIFICATE OF CORRECTION (continued)
U.S. Pat. No. 9,878,913 B2

In Column 4, Line 8, delete "with water" and insert -- with distilled water --, therefor.

In Column 4, Lines 10-11, delete "with water" and insert -- with distilled water --, therefor.

In Column 4, Line 16, delete "120, water" and insert -- 120, distilled water --, therefor.

In Column 5, Line 34, delete "graphene 152." and insert -- graphene. --, therefor.

In Column 6, Line 18, delete "herein. Program" and insert -- herein. Computer program --, therefor.

In Column 6, Line 24, delete "processor 154" and insert -- chamber 154 --, therefor.

In Column 6, Line 26, delete "medium 302." and insert -- signal bearing medium 302. --, therefor.

In Column 6, Line 28, delete "306; such" and insert -- 306, such --, therefor.

In Column 6, Line 29, delete "hard disk drive," and insert -- hard disk drive (HDD), --, therefor.

In Column 6, Line 38, delete "communications link," and insert -- communication link, --, therefor.

In Column 6, Line 57, delete "one more" and insert -- one or more --, therefor.

In Column 6, Lines 63-64, delete "implementations memory" and insert -- implementations, memory --, therefor.

In Column 8, Line 54, delete "recitation no" and insert -- recitation, no --, therefor.

In the Claims

In Column 9, Line 8, delete "general such" and insert -- general, such --, therefor.

In Column 9, Line 14, delete "general such" and insert -- general, such --, therefor.